Nov. 15, 1955  L. A. AMTSBERG  2,723,777
POWER DRIVEN TOOL FOR UPSETTING TUBULAR
RIVETS OR CLINCH NUTS
Filed July 15, 1952                         7 Sheets-Sheet 1
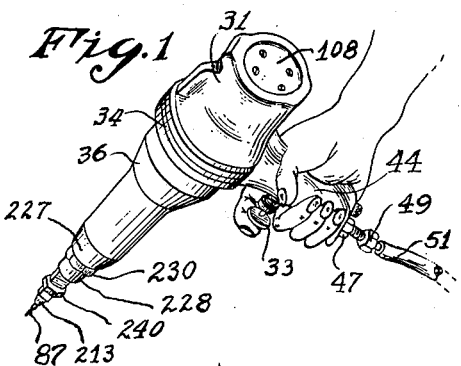
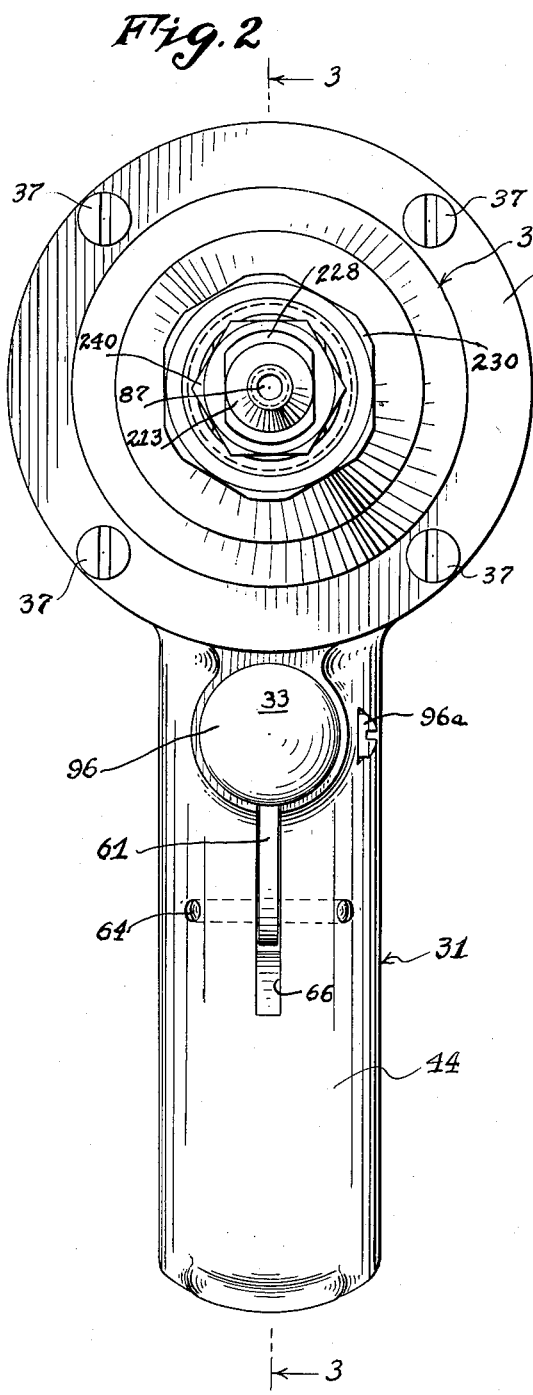
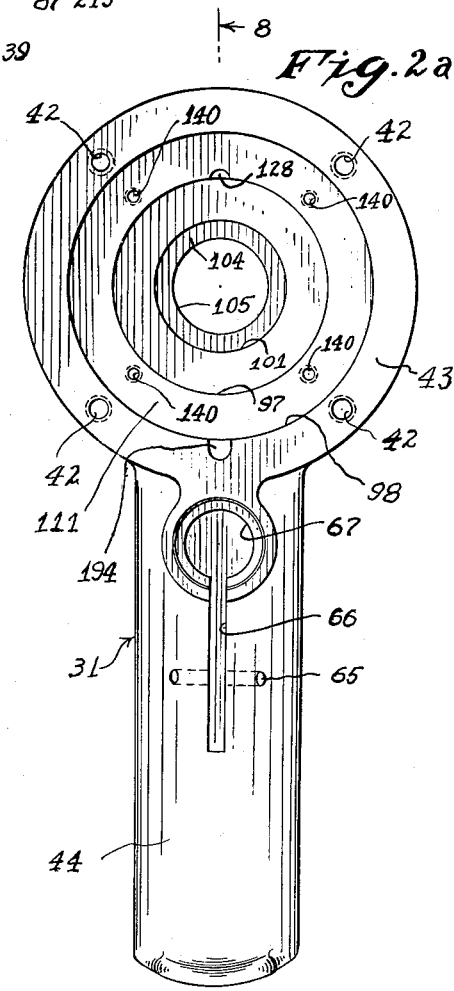
INVENTOR.
LESTER A. AMTSBERG
BY
Raymond G. Mullee
ATTORNEY

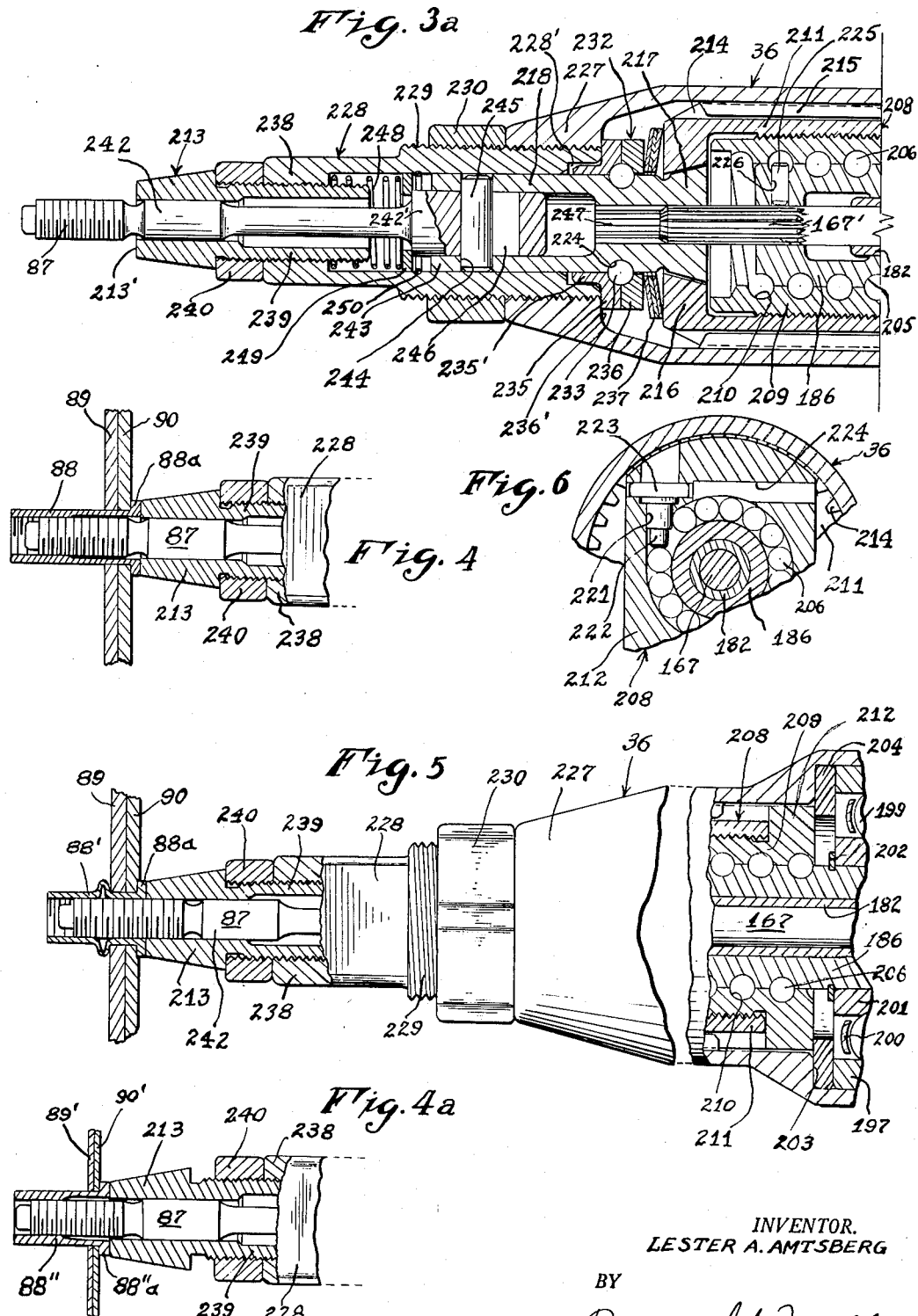

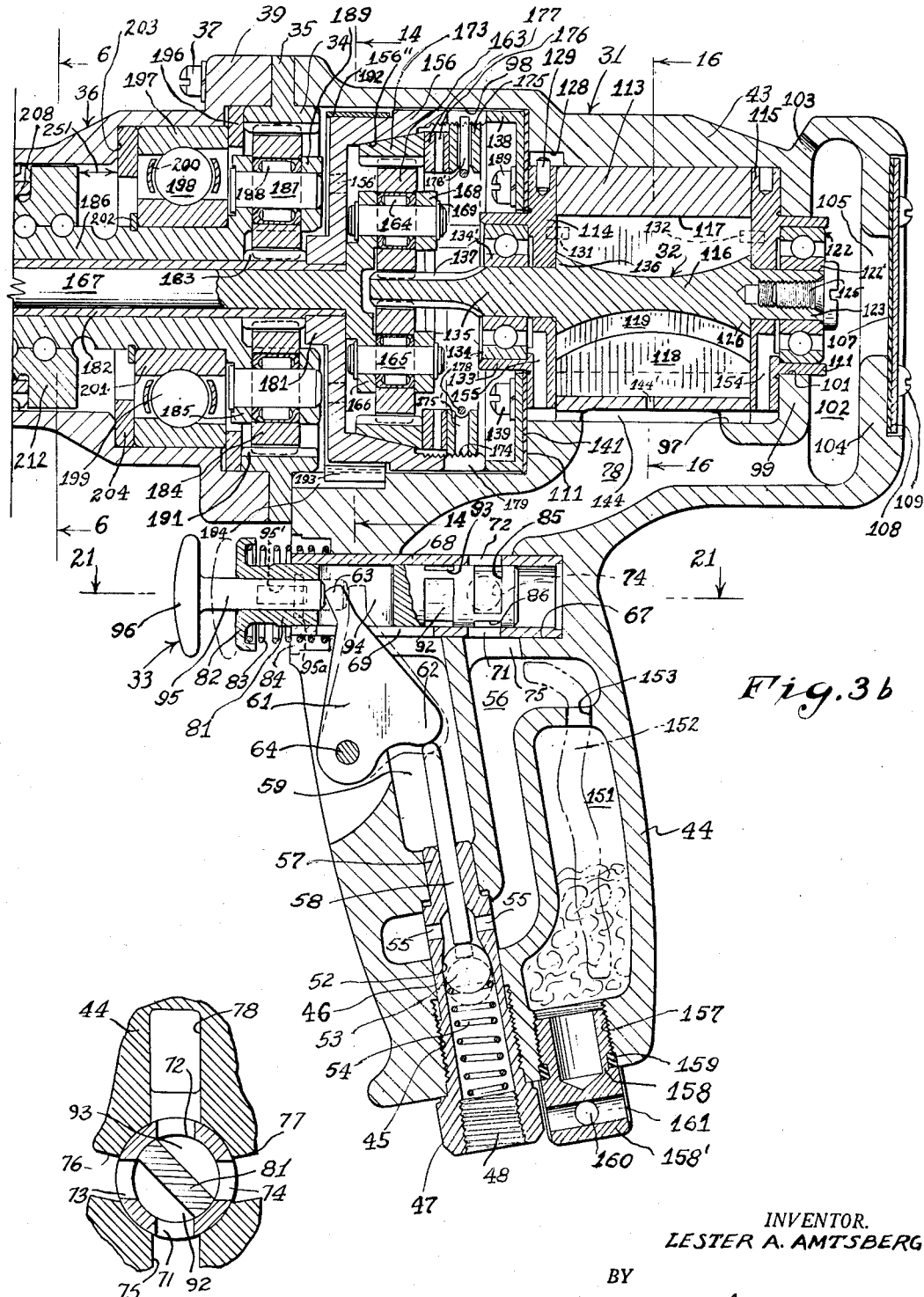

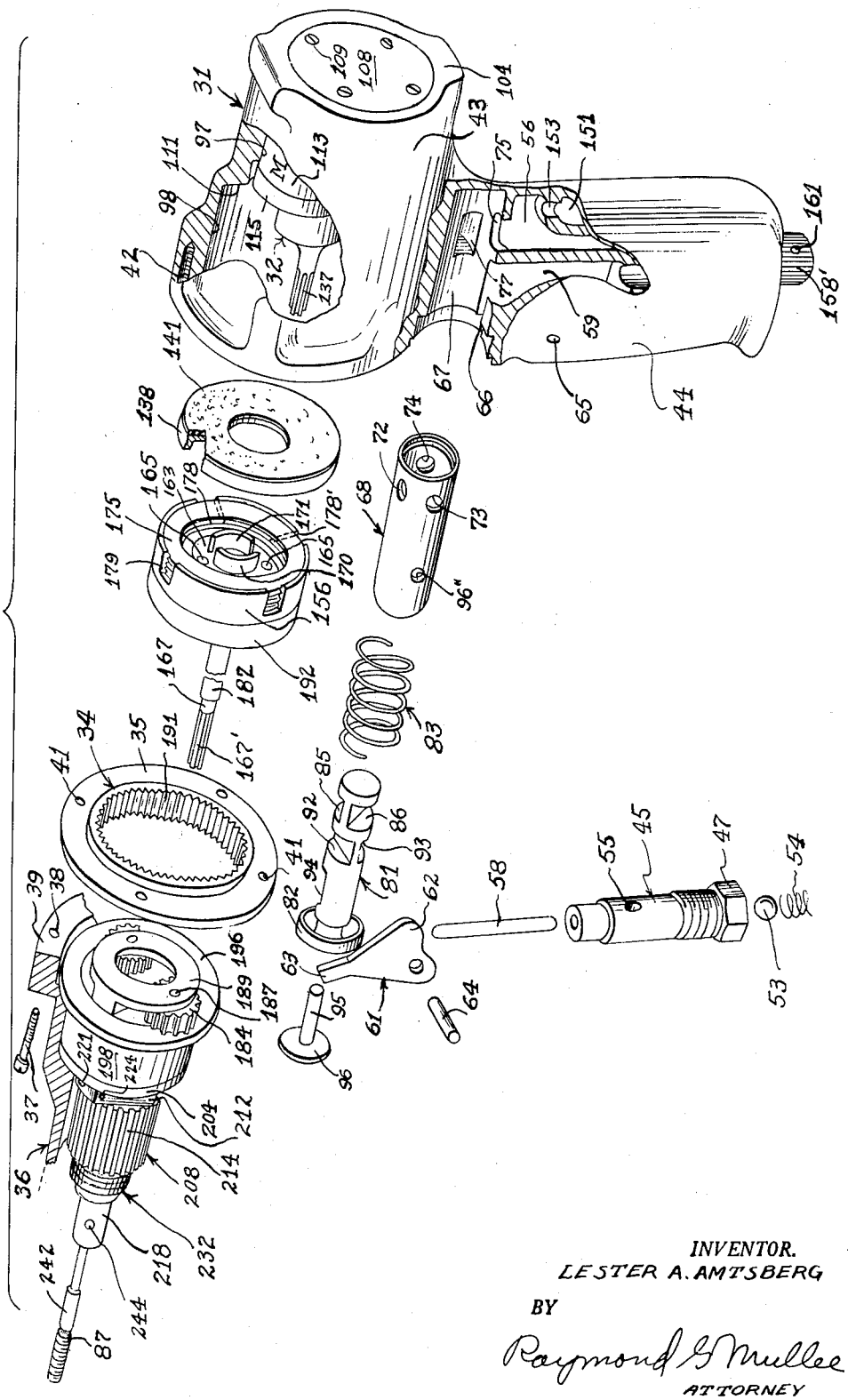

Nov. 15, 1955
L. A. AMTSBERG
2,723,777
POWER DRIVEN TOOL FOR UPSETTING TUBULAR
RIVETS OR CLINCH NUTS
Filed July 15, 1952
7 Sheets-Sheet 5
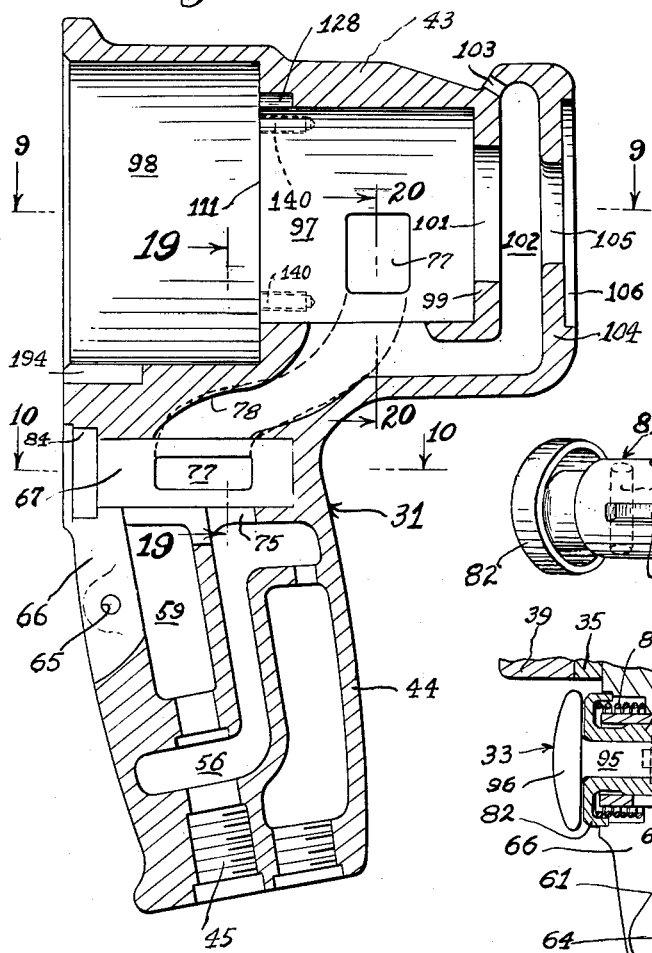
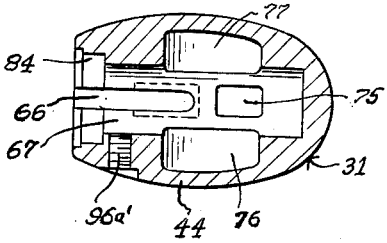
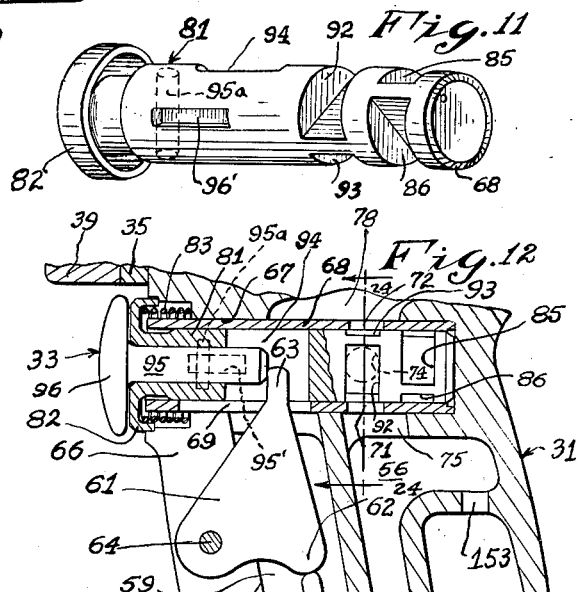
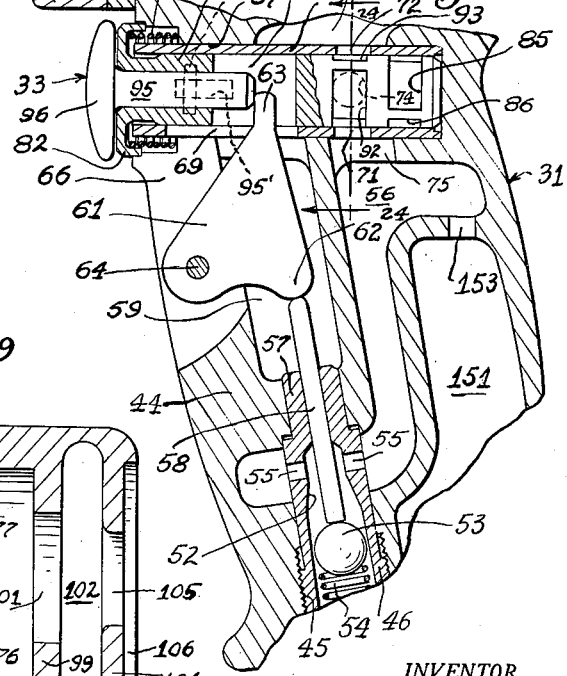
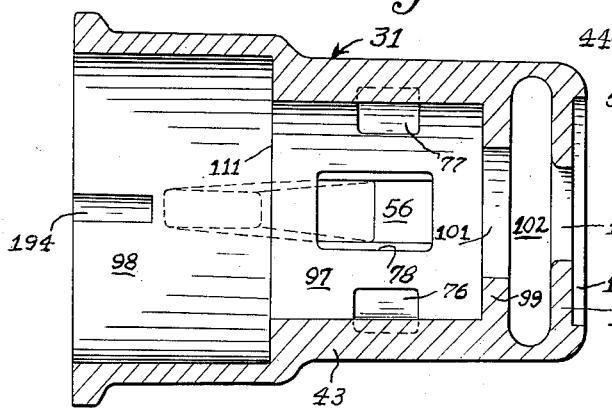
INVENTOR.
LESTER A. AMTSBERG
BY
Raymond G. Mullee
ATTORNEY

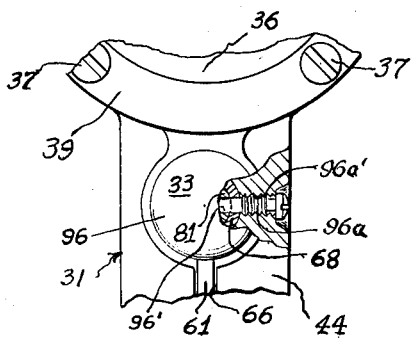
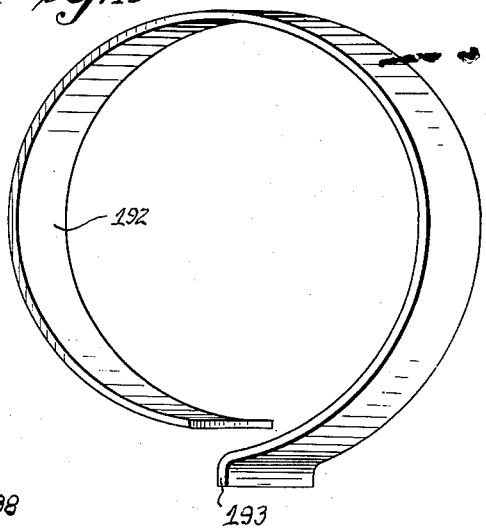
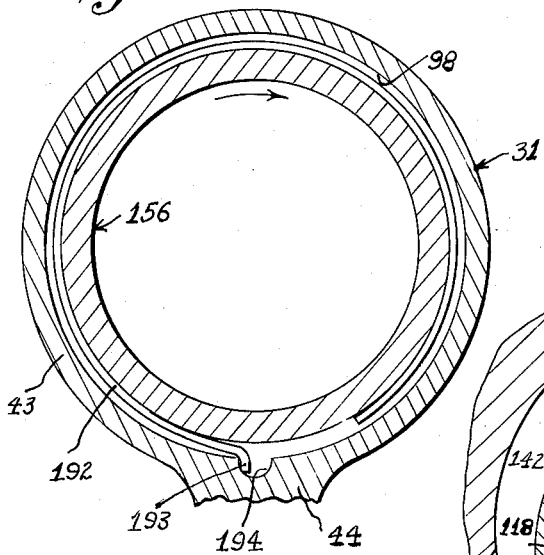
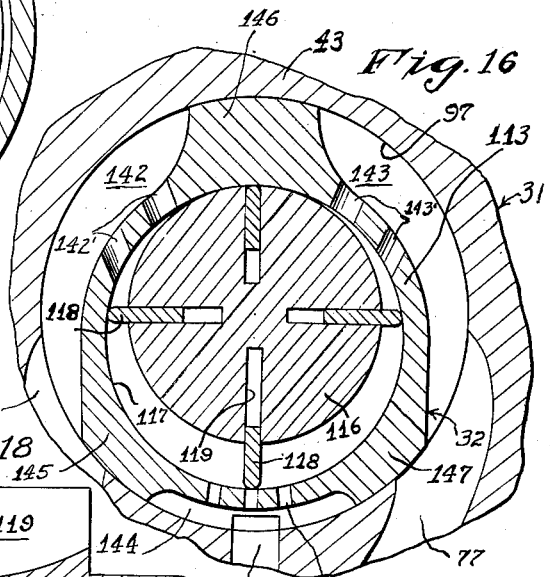
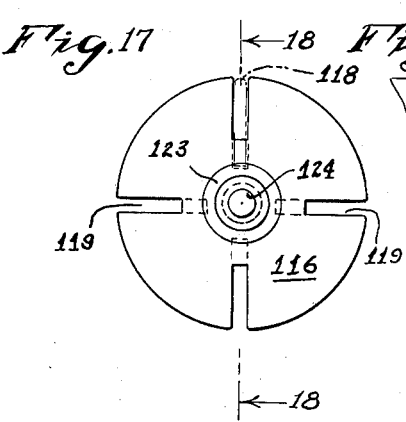
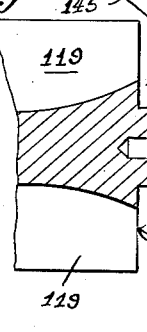

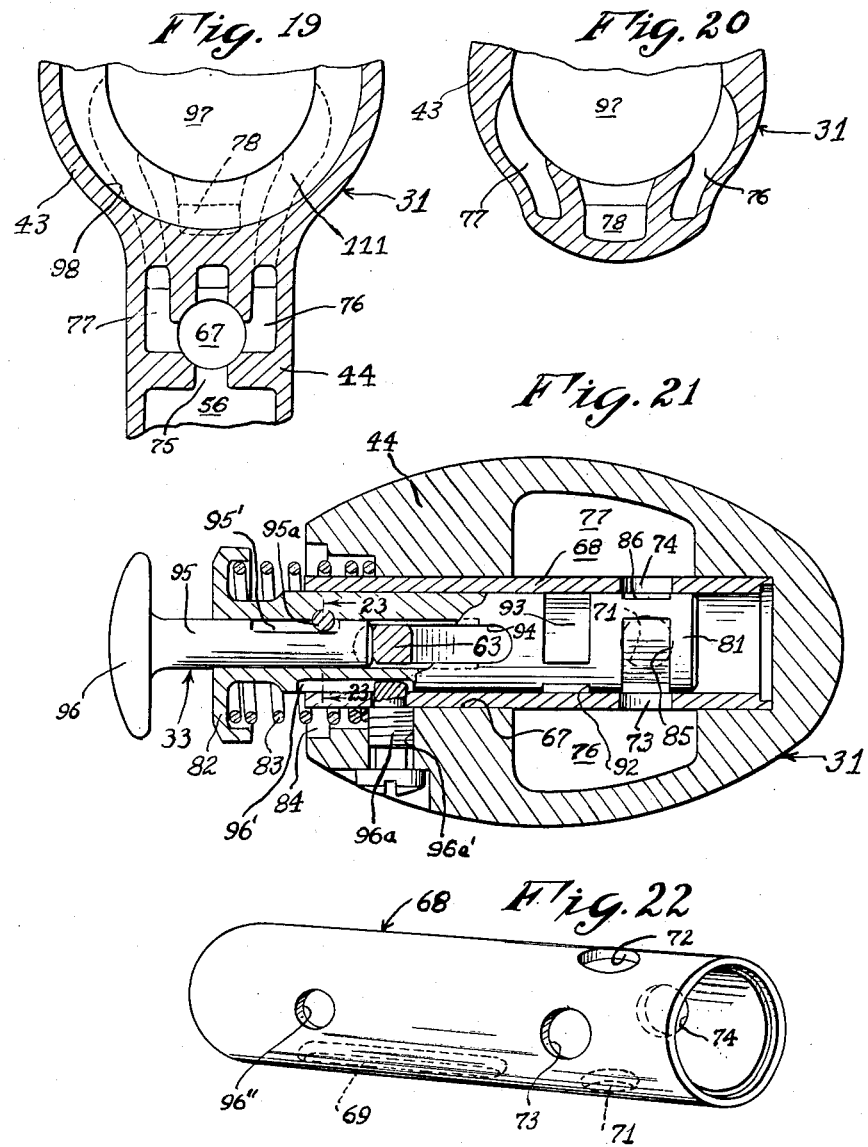

United States Patent Office 2,723,777
Patented Nov. 15, 1955

2,723,777

POWER DRIVEN TOOL FOR UPSETTING TUBULAR RIVETS OR CLINCH NUTS

Lester A. Amtsberg, New Hartford, N. Y., assignor to Chicago Pneumatic Tool Company, New York, N. Y., a corporation of New Jersey Application July 15, 1952, Serial No. 298,910

20 Claims. (Cl. 218—45)

This invention relates to power-driven tools for upsetting internally-threaded tubular rivets or clinch nuts which tools are of a type which will automatically impart rotary and axial motions in successive steps to upset the rivet and thereafter reverse rotary motion to disconnect the tool from the rivet.

Tubular rivets or clinch nuts have a partially internally threaded shank portion and a flanged head on one end of the shank portion. The shank portion is inserted in a hole in a wall structure with the flanged head abutting the surface thereof and thereafter the threaded part of the shank portion is pulled relative to the flanged head by a threaded mandrel of the tool and the unthreaded part of the shank portion is upset and squeezed against the opposite side of the wall structure to fix the rivet thereto. Thereafter, a fastening screw may be threaded upon the rivet.

The wall structure may be in the form of thin metal sheets, too thin for screw threading, and, in which it is desired to have threaded openings for the attachment thereto of another sheet or part by means of fastening screws. One special application of these tubular rivets or clinch nuts is in the installation of a rubber de-icing layer on an airplane wing. By means of these rivets or clinch nuts, the de-icing equipment can be installed after the wing has been formed and by simply drilling holes into the wing surface and fixing the internally-threaded tubular rivets thereto with power-driven upsetting tools which are as nearly automatic in their operations as possible.

These power-driven upsetting tools have a threaded mandrel adapted to enter the rivets or nuts by a rotary motion and to pull and upset them immediately thereafter by an axial motion upon the tool anvil engaging the flanged head of the rivet. After the nut has been upset, the tool mandrel is rotated in a reverse direction and is thereby disengaged from the clinched or upset nut. These power-driven tools usually have either a single motor element for operating the mandrel or two motor elements, one for rotating the mandrel and the other for effecting the pulling or axial motion of the mandrel to effect the upsetting action.

It is an object of the present invention to provide a power-driven tool for upsetting internally-threaded tubular rivets or clinch nuts wherein a slip clutch arrangement is used with a reversible air motor to permit slipping of the drive gear when the anvil has come to rest upon the flanged head of the rivet or clinch nut, and wherein the upsetting of the rivet or clinch nut is effected, upon a clutch element of a first planetary drive gear arrangement being released, by a second drive gear arrangement that operates a ball bearing jackscrew sleeve that pulls the chuck containing the mandrel and the head of the clinch nut against the anvil to upset the clinch nut and fix it to the metal sheets.

It is another object of the invention to provide a power-driven tool for upsetting tubular rivets or clinch nuts employing a reversible air motor wherein the clutch, which is associated with the driving gear, is normally retained by a drag ring that restrains the drive gear when the air motor is driven to engage the mandrel on the tool with the clinch nut and which more forcefully restrains the drive gear as the air motor is rotated in a reverse direction to disengage the mandrel from the clinch nut at the end of the upsetting operation.

It is another object of the invention to provide a power-driven tool for upsetting internally-threaded tubular rivets or clinch nuts wherein there is little chance of premature pull up of the clinch nut due to coasting of the air motor or lack of precise throttle control as when the clinch nut is being attached to the tool when free of the opening in the metal sheets to which it is to be placed, and wherein the rivet is held firmly against the tool anvil prior to the insertion of the rivet into the hole of the work sheets by means of a lost-motion connection between the mandrel and the upsetting chuck and a spring disposed between the mandrel and the anvil housing so that the clinch nut is held in the proper position upon the tool to be ready for the upsetting action upon the clinch nut being inserted in the hole of the work sheets by the tool.

It is another object of the invention to provide a power-driven tool for upsetting tubular rivets or clinch nuts in which a tool can be readily adapted for different lengths of rivets or clinch nuts by an adjustment of the anvil within the tool housing and the length of the effective pull up stroke as predetermined by the length of the rivet and the thickness of the work sheets to which the rivet is being applied, by the provision of an adjustable jackscrew sleeve which can be adjusted to alter the effective pull by the action of the jackscrew upon the same.

It is another object of the invention to provide a power-driven tool for upsetting tubular rivets or clinch nuts having an air motor control unit that is operable for forward and reverse rotations of the air motor by pulling, with the finger, the control button in the same direction and in two steps.

Other objects of the invention are to provide a power-driven tool of this type, having the above objects in mind, which is of simple construction, easy to assemble, has the automatic release of the parts at the end of the engagement of the mandrel with the clinch nut and at the end of the upsetting action or pull up of the mandrel, compact, durable and with little opportunity for breakage of the parts, easy to adjust for different size rivets and length of upsetting stroke, has overload protection, has positive means to prevent further jackscrew rotation at the end of the pull up stroke, due to high speed rotor inertia of the air motor or due to high air line pressure, of pleasing appearance, easy and convenient, and efficient in operation.

For other objects and for a better understanding of the invention, reference may be had to the following detailed description taken in connection with the accompanying drawing, in which Figure 1 is a perspective view of the tubular rivet or clinch nut power-driven upsetting tool constructed according to the present invention with its handle being in the hand of an operator having his forefinger extending over the operating button and with the air hose being connected to the handle, Fig. 2 is an enlarged front end elevational view of the power-driven tool, Fig. 2a is a front elevational view of the handle casting stripped of its internal parts, Figs. 3a and 3b, on separate sheets of the drawing, are full size longitudinal sectional views showing respectively forward and rearward portions of the power-driven tool taken generally on line 3—3 of Fig. 2 and which collectively show the full extent of the power tool, Fig. 4 is a fragmentary sectional view of the mandrel end or forward portion of the tool and having a long tubular rivet or clinch nut and the tool mandrel with the rivet or nut extended through registered openings in two joined metal sheets and preparatory to the clinching operation, Fig. 4a is a fragmentary sectional view, similar to Fig. 4, of the mandrel end or forward portion of the tool adjusted and adapted for the use of a smaller size rivet with the tool, Fig. 5 is an enlarged fragmentary and sectional view of the forward portion of the tool, the tool having been actuated to upset the rivet or clinch nut, whereby the rivet is fixed within the openings of the sheet metal parts, and after the mandrel has been partly rotated in a reverse direction in the process of removing the tool from the rivet, Fig. 6 is a fragmentary transverse sectional view taken generally on line 6—6 of Fig. 3b to show the arrangement of the jackscrew ball bearings in the helical space provided by the joined grooves of the jackscrew and the jackscrew sleeve and the stop pin for retaining the ball bearings at one end thereof, Fig. 7 is an exploded and perspective view of the power-driven tool assembly with sub-assemblies and various parts removed from the handle casting and the jackscrew housing, Fig. 8 is a longitudinal sectional view of the tool handle casting taken on line 8—8 of Fig. 2a, Fig. 9 is a horizontal sectional view of the handle casting taken on line 9—9 of Fig. 8, Fig. 10 is a horizontal sectional view of the handle casting, taken on line 10—10 of Fig. 8 and through the opening for the forward and reverse valve assembly, Fig. 11 is an enlarged perspective view of the forward and reverse valve assembly removed from the opening in the handle casting, Fig. 12 is an enlarged fragmentary vertical sectional view similar to Fig. 3b of the handle casting but with the forward and reverse air valve assembly mounted therein and the valve assembly button depressed to effect reverse rotation of the air motor and the disengagement of the mandrel from the clinched nut, Fig. 13 is a fragmentary front elevational view of the handle casting and looking upon the face of the press button of the valve assembly and with a portion broken away to show the screw element which is used for securing the air valve assembly in place within the handle casting opening, Fig. 14 is a transverse sectional view taken on line 14—14 of Fig. 3b and showing the drag ring extending over the clutch and anchored in a slot within the handle casting, Fig. 15 is a perspective view of the clutch drag ring removed from the assembly, Fig. 16 is a transverse sectional view of the handle casting and of the rotary air motor, taken generally on line 16—16 of Fig. 3b and looking in the direction of the arrows thereof, Fig. 17 is an end elevational view of the air motor rotor, Fig. 18 is a fragmentary longitudinal sectional view of the air motor rotor taken generally on line 18—18 of Fig. 17 and looking in the direction of the arrows thereof, Fig. 19 is a fragmentary vertical sectional view of the handle casting taken generally on line 19—19 of Fig. 8 to show the vertically-extending air passages thereof, Fig. 20 is a fragmentary vertical sectional view taken at a location rearwardly of the location of which Fig. 19 is taken and on line 20—20 of Fig. 8, Fig. 21 is a longitudinal sectional view taken through the handle casting and the air valve assembly and generally on line 21—21 of Fig. 3b, Fig. 22 is a perspective view of the air valve assembly sleeve that fits the valve opening of the handle casting, and Fig. 23 is a transverse sectional view of the pin connection of the press button shank with the reverse valve element as shown on line 23—23 of Fig. 21.

Fig. 24 is a vertical sectional view taken on line 24—24 of Fig. 12 showing the parts in the position assumed when the valve element is depressed.

Referring now particularly to Figs. 3a and 3b, 31 represents a handle casting that supports a rotary air motor 32, a forward and reverse valve assembly 33 and various other parts which are carried thereby and operable therein in a manner hereinafter described. On the open front face of this casting 31, there is fixed an internal ring gear 34 having an external annular flange 35 that is made fast to the handle casting 31 by an elongated jackscrew housing 36 and fastening screws 37 extending through holes 38 in a flange 39 of the housing 36 and holes 41 of the external annular flange 35 and united with threaded openings 42 in the front face of the handle casting 31.

In Figs. 2, 2a, 3b, 7, 8, 9, 10, 16, 19 and 20, it will be seen that the handle casting 31 has a hollow cylindrical portion 43, which contains the air motor assembly 32, and a depending vertical hand grip portion 44. This hand grip portion 44 has a threaded opening 45 that extends upwardly from its lower end and in which there is threaded a ball valve sleeve fitting 46 having a flanged outer head 47 by which the sleeve fitting 46 can be turned into tight threaded engagement with the threaded opening 45. The flanged head 47 is internally threaded, as indicated at 48, Fig. 3b, to which a fitting 49 of an air hose 51 is attached so as to supply air under pressure to the tool. The valve sleeve fitting 46 has a ball valve seat 52 against which a ball valve element 53 is normally urged by a compression spring 54 which reacts against the air hose fitting 49, when fixed to the flanged head 47 of the valve sleeve 46. In the sleeve fitting 46 and above the ball valve element 53 are radial openings 55 that allow air under pressure when the ball valve element 53 is depressed from its seat 52, to be admitted to air chamber 56 which surrounds the valve sleeve fitting 46 and extends upwardly through the hand grip portion 44 of the handle casting 31. The upper end of the valve fitting 46 has a reduced diameter portion 57 through which operating pin 58 slides for engagement with the ball valve element 53 to force the same from its seat 52 to an open position shown in Fig. 12. The upper end of operating pin 58 extends into space 59 in which a throttle valve lever 61 is worked. This throttle valve lever 61 has a pin engaging portion 62 abutting the upper end of the operating pin 58 and an upwardly-extending projection 63 that extends into the valve assembly 33. Lever 61 is pivoted on a pin 64 extending transversely through hole 65 and a vertical slot 66 extending forwardly from the space 59.

Above the throttle lever 61 and extending longitudinally of the handle casting 31, is a hole 67 which contains the forward and reverse valve assembly 33. The valve assembly 33 has a valve sleeve element 68, Figs. 3b, 7, 11, 12, 13, 21 and 22, that has an elongated bottom slot 69 upwardly through which the projection 63 of the throttle lever 61 extends. The valve sleeve element 68 has vertically-aligned lower and upper radial holes 71 and 72 and opposing radial side holes 73 and 74 at the same axial location thereon. The lower and upper holes 71 and 72 of the sleeve bushing 68 are vertically-aligned with an outlet passage 75 extending upwardly from the air chamber 56. The radial side holes 73 and 74 respectively communicate (Figs. 8, 9 and 16) with side passages 76 and 77 that extend upwardly into the hollow cylindrical portion 43 of the handle casting 31. The upper radial hole 72 of the valve sleeve element 68 communicates with a central vertically-extending exhaust passage 78 in the cylindrical portion 43 of the handle casting 31.

Slidable in the bushing 68 of the valve assembly 33 is a forward and reverse valve element 81, Figs. 3b, 7, 11, 12 and 21 having a flanged forward end 82 for receiving a compression spring 83 operable from an annular recess 84 in the front of the handle casting 31 and surrounding the forward end of the valve sleeve element 68. The compression spring 83 causes the outward displacement of the valve element 81 from the valve sleeve element 68 to normally align recess 85 of the valve element 81, Figs. 3b, 11, 12 and 21, with the holes 72 and 73 of the valve sleeve element 68 and recess 86 with the holes 71 and 74 so as to effect rotation of the air motor 32 in a forward direction for the purpose of connecting a threaded mandrel 87 to a rivet or clinch nut 88 to be connected with metal sheets 89 and 90, in a manner to be hereinafter described. Forwardly of the recesses 85 and 86 are recesses 92 and 93. When the forward and reverse valve element 81 is depressed against the action of the compression spring 83, the recess 92 is aligned with holes 71 and 73 of the valve sleeve element 68 and the recess 93 is aligned with the holes 72 and 74 thereof so as to effect reverse rotation of the air motor 33 for the purpose of disconnecting the mandrel 87 and the tool from the rivet or clinch nut 88 after it has been upset, in a manner also to be hereinafter described. The valve element 81 has a longitudinally-extending elongated slot 94 aligned with the elongated slot 69 of the sleeve element 68 for receiving the upwardly extending projection 63 of the throttle lever 61. Slidable in the flanged end of the valve element 81 is a press button shank 95 having a press button head 96. The press button shank 95 has an elongated side slot 95' that receives a stop pin 95a that is held in a vertical hole 95" in the valve element 81, Figs. 21 and 23. This means limits the axial movement of the press button shank 95 relative to the valve element 81 and retains the shank against forward displacement therefrom.

The valve element 81 has an elongated side slot 96' that receives one end of a set screw 96a, Figs. 13 and 21, which is fixed in a threaded opening 96a' in the hand grip portion 44 of the handle casting 31 and projects through a side hole 96" (Fig. 22) in the valve sleeve element 68. This means limits the axial movement of the valve element 81 relative to the valve sleeve element 68 and holds the entire valve assembly 33 against rotation in the opening 67 and against forward axial displacement therefrom.

The press button head 96 upon being depressed or pulled by the hand grip portion 44 engages the upwardly projecting finger 63 of the throttle lever 61 so that it is pivoted to the dot and dash line position shown in Figs. 3b and 12 thereby to depress the operating pin 58 and the ball 53 from its seat 52 against the action of the compression spring 54 to let air pass to chamber 56. The valve element 81 is not moved upon initial movement of lever 61, that is, the press button head 96 is merely brought into engagement with the flanged forward end 82 of the valve element 81, Fig. 3b. The air motor 32 then runs to thread the rivet and upset it. A further pull on the press button head 96 keeps the ball valve element 53 in its open position and moves the valve element 81 to locate the recesses 92 and 93 thereof with the radial holes 71, 72, 73 and 74 of the valve sleeve element 68, that is, to the position shown in Fig. 12 to cause reverse rotation of the air motor 32 and consequent release of the tool from the upset rivet 88', Fig. 5.

The hollow cylindrical portion 43 of the handle casting 31 has a small diameter opening 97 in which the air motor 32 is disposed, Figs. 2a, 3b, 8, 9 and 16, and a large diameter front opening 98 that contains planetary gearing and clutch parts to be later named, Fig. 3b.

At the rear end of the small opening 97 is a partition wall 99 having a hole 101 therein and separating the opening 97 from a vertically-extending exhaust air chamber 102 constituting a continuation of the exhaust passage, said chamber having a top upwardly and forwardly inclined exhaust air outlet hole 103, Fig. 8. A rear wall 104 lies at the rear end of the cylindrical portion 43 of the handle casting 31. This rear wall has a central hole 105 and a concentric shallow recess 106 on the rear face that contains a gasket 107, Figs. 3b and 7, and a thin closure plate 108 and screws 109 which fix the gasket 107 and the closure plate 108 to the rear wall. An annular shoulder 111 is disposed between the two openings 97 and 98 and intermediate the length of the cylindrical portion 43.

The air motor assembly 32 comprises generally a hollow cylinder 113, Figs. 3b and 16, front and rear end plates 114 and 115 and a rotor 116 eccentrically offset toward one portion of wall 117 of the hollow cylinder 113. The rotor 116 has radially-adjustable blades 118 held outwardly of circumferentially-spaced radial slots 119 due to centrifugal action and have wiping contact with the cylindrical wall 117. These blades are moved inwardly by following the surface of the cylindrical wall 117.

The rear end plate 115 has a rearwardly-extending sleeve portion 121 that fits hole 101 in partition wall 99 and contains a ball bearing unit 122. The rotor 116 has a rearwardly-extending projection 123 which extends through the bearing and is fixed to inner race 122' of the ball bearing unit 122, Figs. 3b, 17 and 18. This rotor projection 123 has a threaded opening 124 which receives a screw 125, Fig. 3b, to which access can be had through opening 105 of the rear wall 104, when the closure plate 108 and sealing plate 107 are removed. This screw 125 has a large head 125' that engages with the rear end of the inner race 123' and holds shoulder 126 of the rotor 116 tightly against the inner face of the rear end plate 115 so that the rotor 116 is held against both forward and rearward displacement relative to the rear end plate 115.

The small diameter opening 97 of the handle casting cylindrical portion 43 has a slot 128 (Fig. 3b) in the top thereof into which a pin 129 carried by the forward end plate 114 is extended whereby to prevent rotation of the air motor assembly in the opening 97 relative to the handle casting 31. The two motor end plates 114 and 115 are respectively fixed to the hollow cylinder 113 by pins 131 and 132 that register with holes in the end plates and motor cylinder 113.

The forward end plate 114 has a forwardly-extending sleeve projection 133 that contains a ball bearing unit 134. The rotor 116 has a forwardly-extending shaft projection 135 that extends through the forward end plate 114 and is fixed to inner race 134' of the bearing unit 134. The rotor 116 has its shoulder 136 held against the inner face of the end plate. This shaft projection has a pinion gear formation 137 on its forward end that extends into the large diameter opening 98 of the handle casting cylinder portion 43.

The air motor assembly 32 is held in the small opening 97 of the handle casting 31 by a motor clamp plate 138 that engages the forward face of the forward end plate 114 and the annular shoulder 111 of the handle casting cylinder portion 43, said shoulder lying between the small and large diameter openings 97 and 98 of casting 43, the securement being by fastening screws 139 that enter circumferentially-spaced threaded holes 140 in the handle casting cylinder portion 43. A sealing washer 141 is disposed between the clamp plate 138 and the shoulder 111 and motor end plate 114.

The motor cylinder 113 and the end plates 114 and 115 joined thereto are relieved on the opposite sides thereof to provide air inlet spaces 142 and 143, and in the bottom thereof an exhaust air outlet space 144. These passages are separated by circumferentially-spaced projecting portions 145, 146 and 147 contacting with the opening wall 97. The air delivery side passage 76 in the handle casting 31 communicates with air inlet space 142 on the left side of the air motor 32, and air from said space is delivered through holes 142' to the interior of the motor to act on blades 118 and drive the rotor 116. The air delivery side passage 77 in the handle casting 31 communicates with the air inlet space 143 at the right side of the motor and air from said space is delivered through holes 143' to the interior of the air motor 32. The rotor 116 will be rotated depending upon the direction from which air is delivered to the air motor. In the bottom of the motor cylinder, are exhaust holes 144' so that the exhaust air can pass to the outlet space 144 and the vertically-extending exhaust passage 78.

In order to lubricate the air motor and the gear parts, within the large diameter opening 98 of the casting cylinder portion 43 and the jackscrew housing 36, there is provided in the handle grip portion an oil-receiving chamber 151 and a wick 152 leading through a hole 153 in air chamber 56, Fig. 3b. The oil vapor from the wick commingles with the air and is delivered therewith through the air motor 32. After passing through the air motor and entering the exhaust outlet space 144 this exhaust air bearing the oil vapors passes through a vertically-extending passage 154 in the motor rear end plate 115 to the interior of the sleeve projection 121 thereof and over the ball bearing unit 122 to the vertically-extending exhaust air chamber 102. This same exhaust air enters a vertically-extending passage 155 of the motor front plate 114 and passes through the ball bearing unit 134 in the plate sleeve projection 133 to the large diameter opening 98 in the handle casting cylinder portion 43 to the gear parts therein. Within this opening 98 is a clutch housing 156 that substantially closes off the front of the opening 98 but which has diametrically-spaced holes 156', Fig. 3b, through which the exhaust air may pass to the ring gear 34 and outer race 197 and thence to jackscrew housing 36. A certain amount of the air with the oil vapors will be exhausted to the atmosphere through the forward end of the tool so that the forward parts will be also lubricated.

In the lower end of the hand grip portion 44 of the handle casting 31 is a threaded opening 157 communicating with the oil chamber 151 through which the oil chamber may be replenished with oil. This threaded opening 157 is closed by a screw plug 158 and a sealing gasket 159. The screw plug 158 has an enlarged head 158' with crossed transverse holes 160 and 161 adapted to receive the end of a tool that may be used to tighten and loosen the screw plug 158.

The pinion gear formation 137 of the air motor rotor 116 meshes with two planet gears 163 mounted by means of needle bearing units 164 and pins 165 on a spider formation 166 of a mandrel spindle 167 that extends forwardly from the handle casting cylinder portion 43 through the ring gear 34 and into the jackscrew housing 36. A planet gear retaining ring 168 is held by small split snap elements 169 on the planet gear pins 165 and against the planet gears 163 and the needle bearing units 164 to retain planet gears thereupon and against rearward displacement from the spider formation 163. The retaining ring 168 has opposing rearwardly-extending spacing portions 170 and 171, Fig. 7, adapted to bear against the sleeve projection 133 of the motor end plate 114 to hold the mandrel spindle 167 against rearward displacement.

An internal gear 173 meshes with the planet gears 163 and is tapered on its outer periphery to have frictional engagement with the tapered interior face 156" of the clutch housing 156 that surrounds the mandrel spindle 167. This clutch housing 156 is internally threaded at its rear end as indicated at 174 to retain a nut 175 that serves to hold a wavy annular clutch spring 176 and a clutch spring seat 177 positioned against the ring gear 173 for the purpose of holding the ring gears in frictional engagement with the tapered face 156" of the clutch housing 156. A wire lock ring 178 has a bent end 178' extending through a hole 175' in the nut 175 and cooperating with one of a plurality of circumferentially-spaced slots 179 in the end of the clutch housing to hold the nut 175 against rotational and axial displacement.

The wavy clutch spring 176 engages annular clutch spring seat 177 which bears against the rear end of the internal ring gear 173. The clutch housing 156 has an enlarged hub portion 181 to which is fixed a pinion sleeve 182 journalled on the mandrel spindle 167 and having pinion teeth 183 meshing with planet gears 184 on spider 185 of a jackscrew 186, Figs. 3a and 3b. The planet gears 184 are journalled on pins 187 by needle bearing units 188. A retaining ring portion 189 of the flange 185 holds the planet gears 184 on the spider flange 185. The planet gears 184 mesh with gear teeth 191 of internal ring gear 34.

The clutch housing 156 is normally held against rotation by a split drag spring ring 192 having frictional contact with the outer surface of the clutch housing 156. One end of the spring ring 192 is bent outwardly, as indicated at 193, Figs. 3b and 14, for engagement with a slot 194 in the bottom of the cylindrical portion 43 of the handle casting 31. This drag spring ring 192 holds the clutch housing 156 against rotation while the mandrel spindle 167 is operating to effect rotation of the mandrel 87 and the engagement of the threads thereof with the rivet or clinch nut 88.

When the torque upon the threads of the clinch nut 88 has become sufficient to cause the spring drag ring to release the clutch housing 156, the pinion gear teeth 183 of the pinion sleeve 182 then drives the planet gears 184 that react between the gear teeth 191 of the internal ring gear 34 and the jackscrew spider flange 185 and thereby turn the jackscrew 186.

A bearing clamp plate 196 abuts the internal gear ring 34 and is abutted by outer race 197 of a ball bearing unit 198 having ball elements 199 and a ball retainer 200. An inner race 201 abuts jackscrew flange 185 and is fixed on the jackscrew 186 by a retaining ring 202, Fig. 3b. The jackscrew housing 36 has a shoulder 203 for receiving a thrust plate 204 against which outer race 197 reacts. The jackscrew 186 has a spiral groove 205 in which ball elements 206 are disposed.

A jackscrew sleeve assembly 208 surrounds the jackscrew 186 and comprises an inner externally-threaded sleeve 209 having a spiral groove 210 for receiving the ball elements 206, Figs. 3a and 5, and an outer internally-threaded sleeve 211 axially threaded to the inner sleeve 209 to provide the jackscrew sleeve assembly. The jackscrew sleeve assembly 208 is secured to the jackscrew 186 through the ball elements 206 that run in the joined grooves of the jackscrew and the sleeve assembly. The inner sleeve 209 has a rear flange 212 that is normally held spaced from the thrust plate 204. While the mandrel 27 is being threaded to the clinch nut, there is no movement of the jackscrew. Only when anvil 213 engages tightly flange 88a of the rivet or clinch nut 88 will the clutch housing 156 be able to turn despite the drag of the split drag spring ring 192 and the jackscrew 186 be driven through planet gears 184.

The outer sleeve 211 of the jackscrew sleeve assembly 208 has splines 214 that telescope with internal splines 215 of the jackscrew housing 36 to hold the jackscrew sleeve assembly against rotation but permitting axial adjustment of the assembly 208 to upset the rivet 88. The forward end of the outer jackscrew sleeve 211 has an enlarged internally-tapered head 216 that engages a conical head 217 on the rear end of a mandrel drive chuck 218.

The rear flange 212 of the inner jackscrew sleeve 209 has a hole 221 through which the balls are loaded into the joined grooves 205 and 206 of the jackscrew 186 and the jackscrew sleeve assembly 208, Fig. 6, and which are retained within the jackscrew sleeve assembly 208 by a pin 222 loosely fitting hole 221 and retained therein by a round pin 223 press-fitted in a transverse hole 224 in the flange 212.

On the forward end of the jackscrew 186 is a round pin 225 lying in a radial hole 226, Fig. 3a, and which projects into the forward end of the spiral groove 205 of the jackscrew 186 whereby to prevent the release of the steel ball elements 207 from the forward end of the jackscrew.

The forward end of the jackscrew housing 36 has a tapered internally-threaded end formation 227 which threadedly receives a mandrel housing 228 in which the mandrel drive chuck 218 is journalled. The mandrel drive chuck is threaded as indicated at 229 and can be axially adjusted to different positions relative to the jackscrew housing 36. A lock nut 230 holds the mandrel housing in locked engagement with the tapered end 227 of the jackscrew housing 36.

Surrounding the mandrel drive chuck 218 is a thrust bearing assembly 232 having ball elements 233 lying in an annular groove 234 in the mandrel drive chuck 218, a bearing plate 235 that engages a shoulder face 236' on the housing 36 and provided by the tapered end formation 227. This plate 235 has a hollow sleeve portion 235' that enters an annular recess 228' in the end of the mandrel chuck housing 218. A rear bearing plate 236 engages ball elements 233 and against which rests conical drive chuck spring washers 237 tending to normally urge the mandrel drive chuck forwardly toward the shoulder face 236' and which react against the internally-tapered head 216 of the jackscrew sleeve assembly 208.

The drive chuck conical head 217 is normally held slightly out of engagement with the internally-tapered head 216 of the jackscrew sleeve assembly 208. The mandrel housing 228 has an internally-threaded end formation 238 with which threaded shank 239 of anvil 213 is threadedly and axially adjustably connected. This anvil 213 is thus adjustable in the mandrel housing 228 to adapt the tool for different lengths of rivets or clinch nuts 88. The anvil 213 is adjusted for operation upon the maximum length rivets as shown in Figs. 3a, 4 and 5. The anvil 213 is tapered and has an engaging front face 213' adapted to abut the flange 88a of the rivet. The anvil 213 is fixed in its adjusted position within the mandrel housing 228 by a lock nut 240 that is tightened against the forward end of the mandrel housing 228. If the anvil 213 is extended as shown in Fig. 4a and locked in its extended position by the lock nut 240, the tool will be adapted for use with a short rivet 88'' which will serve to secure thin metal sheets 89' and 90' together. The anvil 213 will similarly engage flange 88''a of the rivet 88'' when the upsetting operation is to be effected. A similar adjustment can be provided by moving the mandrel housing 228 out of the jackscrew housing 36 and resetting the lock nut 230 thereagainst.

The mandrel 87 has a bearing portion 242 that is journalled in the head end of the anvil 213, and an enlarged slotted rear end portion 242' that telescopically and slidably fits a forwardly-extending hollow sleeve portion 243 of the mandrel drive chuck 218 that has a transverse hole 244 for receiving a cross pin 245. The enlarged rear end portion 242' of the mandrel 87 has an elongated slot 246 that receives the cross pin 245. By this cross pin 245 rotation of the chuck 218 is imparted to the mandrel 87. The chuck 218 has a central splined opening 247 extending through the tapered head end 217 thereof and slidably receives splined end 167' of the mandrel spindle 167 to be driven thereby. The mandrel 87 is accordingly axially adjustable in the mandrel chuck 218.

A mandrel spring 248 acts against the internal threaded end portion 238 of the mandrel housing 228 and a mandrel spring seat ring 249 that engages enlargement 242' of the mandrel 87 and normally urges the forward end of elongated slot 246 against the cross pin 245 of the chuck 218. A stop ring 250 limits the rearward movement of the mandrel spring seat 249.

Once the anvil 213 has been adjusted for the particular rivet length by means of its threaded connection with the mandrel housing 228 and the jackscrew sleeve assembly adjusted for the extent of the upsetting stroke and the lock nut 240 tightened upon the threaded portion of the anvil 213 to hold the anvil in its adjusted position, the tool is made ready for operation. Also, the tool is adjusted by the mandrel in the enlarged tapered end 227 of the jackscrew housing 36 to place the chuck head 217 slightly out of contact with the tapered formation 216 of the jackscrew sleeve assembly so as to allow for free driving of the mandrel chuck 218 and mandrel 87 by the mandrel spindle 167. There is left a space indicated by the arrows 251, Fig. 3b which represents the maximum effective pull up stroke of the mandrel. The extent of the stroke is varied by adjusting the inner jackscrew sleeve 209 relative to the outer jackscrew sleeve 211. Accordingly, the stroke can be reduced or lengthened to alter the tool for the different length of the rivets and the thickness of the work sheets 89 and 90 which are to be secured together by the rivets 88.

The operation of the tool will now be set forth: The tubular rivet or clinch nut may be either inserted in the hole in the work sheets or can be held in the hand to attach the mandrel 87 to it. Operation under the latter condition will be described. By pulling the press button head 96 to the dotted line position shown in Fig. 3b, that is, until the operator senses contact of said head 96 with element 82 resulting from increased resistance encountered from spring 83 upon said contact, the shank 95 thereof pivots the throttle lever 61 rearwardly and depresses pin 58 so as to downwardly force the ball 53 from the seat 52 in the sleeve fitting 46 and against the action of the compression spring 54. Air under pressure moves upwardly through the fitting 46, past valve seat 52 and discharges through radial openings 55 into air chamber 56 in the hand grip portion 44 of the handle casting 31. The air leaves the chamber 56 through the top outlet passage 75 thereof and enters bottom hole 71 of the bushing 68, passes through notch 86 in the valve element 81, side hole 74 of the bushing 68, upwardly through right side passage 77 (Figs. 7 and 8) in the handle casting 31 to air inlet space 143 on the right side of the air motor 32, Figs. 3b and 16, and downwardly through holes 143' in the hollow cylinder 113 whereby to engage blades 118 of the rotor 116 whereby to effect right hand rotation of the motor pinion gear 137. This entering air will have picked up oil from the wick 152 that extends into chamber 56 and will lubricate the rotor blades and the cylindrical wall surface 117, Fig. 16. The air exhausts from motor 32 through holes 144' into air outlet space 144 and central exhaust passage 78 in the handle casting 31. From the central passage 78, and except for the exhaust air which passes the holes 154 and 155 (Fig. 3b) of the respective motor end plates to lubricate the ball bearing units 122 and 134 therein and the gear parts forwardly thereof, the exhaust air will leave the handle casting 31 through the rear exhaust air chamber 102 and top exhaust holes 103. Such exhaust air that passes from space 144 into passage 78 (Figs. 3b and 16) enters hole 72 of the bushing 68, passes notch 85 of the valve element 81, side bushing hole 73, left side passage 76, air inlet space 142 and holes 142', will have little effect upon rotor blade as its pressure will have been depleted due to being exhausted through top holes 103 to the atmosphere.

Right-hand rotation of the motor spindle pinion gear 137 drives the planet gears 163 which react against the temporarily stationary internal ring gear 173 so as to drive the mandrel spindle 167 in the same direction as the motor spindle pinion gear 137. The ring gear 173 during this phase of the operation is restrained from rotation in the clutch housing 156 by the frictional engagement of the ring gear 173 with clutch face 156'' of the clutch housing 156, this frictional engagement resulting from the force of the wavy spring 176 acting to push upon spring plate 177 which in turn pushes on the end of the ring gear 173. The clutch housing 156 is prevented from rotating by the frictional contact of the drag spring ring 192. This drag ring 192 is split and has close spring-like contact with the outer periphery of the clutch housing 156 as shown best in Figs. 3b, 14 and 15. The bent projected end 193 of the drag ring 192 engages the notch 194 in the handle casting 31 whereby the drag spring 192 prevents the rotation of the clutch housing and thereby premature jackscrew action. The clutch housing 156 has to be held stationary during the threading of the mandrel 87 into rivet 88, and to insure this the frictional drag of the drag ring is substantially greater than the frictional torque exerted by the mating threads of the rivet or clinch nut 88 and of the mandrel 87. Likewise the pressure of wavy annular spring 176 must be great enough to create between ring gear 173 and temporarily stationary clutch housing 156 sufficient friction that said ring also will be held stationary. The stationary ring 173 thus causes the gears 163, and hence the spindle 167, to turn clockwise about the axis of pinion gear 137.

The mandrel spindle 167 drives through the telescoping connection of the splined end 167' of the spindle and the splines 247 of the mandrel chuck 218. The mandrel chuck 218 in turn drives the mandrel 87 by means of the pin 245 and the slot 246 in the mandrel enlargement 242'. As the mandrel 87 threads into the tubular rivet 88, which remains stationary and in the hand of the operator, the remainder of the tool is drawn forwardly until the anvil 213 contacts the head of the rivet, after which the anvil and rivet remain stationary relative to each other but the mandrel 87 continues to be threaded into the rivet until the right hand end of the slot 246 comes into contact with the pin 245 after which the continuing threading action of the mandrel into the rivet pulls the mandrel chuck 218 forwardly, removing any clearance of the balls 233 and the forward thrust plate 235 of the thrust bearing assembly 232. The flange 88a of the rivet 88 is thereby pulled into tight frictional contact with the end face 213' of the anvil 213. The friction between gear ring 173 and clutch housing 156 is greater than between housing 156 and drag ring 192, whereby the housing 156 begins to turn with gear ring 173 upon establishment of this tight frictional engagement.

With proper adjustment of the anvil having been made preparatory to use of the tool, just prior to the pull-up or collapsing stroke the larger portion of the rivet threads are engaged by the mandrel 87. The rivet need not be assembled in the work sheets before the threading action is effected but may be held in the hand while so doing, as previously stated. Frequently, and particularly in overhead work, the tubular rivet is thus hand-held while being only partially engaged by the mandrel 87 whereupon the air supply is temporarily cut off by release of button head 96 and the rivet is then inserted into the work hole by the tool and thereafter the button head 96 is again pressed to its intermediate position and the threading action upon the rivet is completed. The slot 246 of the mandrel 87, under this latter procedure, permits lost motion between the mandrel 87 and the chuck 218 and thereby minimizes the possibility of pull up, or collapse, prior to insertion of the rivet into the work due to coasting of the air motor 32 or lack of precise throttle control. Mandrel spring 248 acting against mandrel spring seat 249 holds the rivet 88 firmly against the anvil 213 once the head of the rivet has become seated thereagainst.

As the anvil face 213' is brought into tight contact with the flanged head 88a of the rivet 88 a large axial force is developed between the anvil and the rivet head due to the mechanical advantage of the screw threads of the mandrel and the rivet. This force produces sufficient frictional torque to prevent further rotation of the mandrel 87, the mandrel chuck 218, and the spindle 167, and this torque force is many times greater than the frictional force exerted by the drag ring 192 upon the clutch housing 156. When this tightening occurs the frictional drag of the ring 192 is overcome and the pull-up or upsetting stroke is automatically initiated in the manner now to be set forth.

Rotation of mandrel 87 and spindle 167 having ceased, as just stated, rotation of gears 163 about the axis of spindle 167 likewise ceases, but the air motor rotor pinion gear 137 continues to rotate clockwise and thereby, through rotation of the gears 163 about their axes, the planetary gears 163 impart left-hand rotation to the ring gear 173 and the clutch housing 156 fixedly connected to pinion sleeve 182 carrying pinion gear teeth 183. The pinion gear teeth 183 of the pinion sleeve 182, through the action of planetary gears 184 and teeth 191 of stationary ring gear 34, drives jackscrew 186 in a lefthand direction. The jackscrew 186 has the helical groove 205 that cooperates with groove 210 of the jackscrew sleeve assembly 208 to form a helical path for the steel balls 206 held therein by pins 221 and 226.

Since the jackscrew sleeve 211 is held from rotation by the connection of its splines 214 with the splines 215 of the jackscrew sleeve housing 36 (Figs. 3a and 7), the jackscrew sleeve assembly 208 (consisting of elements 209 and 211) is moved rearwardly as the jackscrew 186 is rotated in a left-hand direction, through the wedging action of the left-hand helical grooves connected by the rolling action of the balls 206. The initial movement of the jackscrew sleeve assembly 208 consumes the small clearance between the tapered formation 216 and the tapered head 217 of the mandrel chuck 218 and immediately as these conical surfaces contact one another the actual pull-up stroke begins. The chuck 218 and the mandrel 87 are pulled by the jackscrew sleeve assembly 208 so as to collapse the rivet 88. This movement of the jackscrew sleeve assembly 208 is terminated by the engagement of its flanged end 212 with the thrust bearing plate 204, if not terminated earlier by completion of the collapse of the rivet shank. During the pull up stroke the axial forward thrust is transmitted through the casing 36, and the thrust bearing assembly 232 and spring washers 237 move rearwardly with the chuck 218 and hence away from the shoulder face 236'. Throughout the pull-up stroke the pull-up force has been transmitted through the transverse pin 245 acting against the rear end of the slot 246 of the mandrel 87. The screw connection between elements 209 and 211 does not function during operation but does permit adjustment of these clearances.

The blocking of the rearward axial movement at the completion of the pull-up stroke prevents further jackscrew rotation and rotation of the various gear trains. Without some means of over-load protection from shock loads due to high speed rotor inertia or over-load due to high air line pressure, damage to these locked members could result. Such damage is prevented by an assembly comprising the clutch housing 156, clutch surface 156", ring gear 173, spring seat 177, wavy spring 176 and adjusting nut 175. The torque capacity of this assembly is set by adjusting nut 175 and wavy spring 176 to permit slip at surface 156" at a slightly greater value than the torque required to upset the strongest rivet handled by the tool. During the over-run before the operator reverses rotation for the return stroke, ring gear 173 rotates within the clutch housing 156, the slipping taking place at the clutch surfaces 156" but spindle 167, due to this slippage, does not rotate. Throughout the pull up stroke, the pull up force has been transmitted through the transverse pin 245 acting against the rear end of the slot 246 of the mandrel 87.

With the rivet having been set it is now necessary to release the mandrel 87 from the rivet and to back off the tool. The press button head 96 is then pulled rearwardly all the way to force the valve element 81 to assume its reversing position shown in Figure 12. The notches 92 and 93 will be brought into alignment with the holes 71, 72, 73 and 74. The throttle lever 61 will be depressed from the halfway position at which it has been held up to this stage and the ball 53 will remain removed from its seat 52. Air under pressure will continue to be admitted to the chamber 56 where it gathers oil from wick 152 and will pass upwardly through outlet passage 75, hole 71, notch 92, hole 73 in the bushing 68, left-hand passage 76 in handle casting 43, passage 142 and holes 142' on the left side of the air motor whereby to reverse the rotation of the air motor rotor 116.

The reversal of rotation of the air motor rotor will tend to rotate the mandrel spindle 167 in the same, that is, left hand, direction and the clutch housing 156 in the opposite or right-hand direction. However, the mandrel spindle 167 is prevented from rotating by its spline connection 167', 247 with the mandrel chuck 218 which in turn is held from rotating in part by means of the tight connection between the chuck head 217 and sleeve head 216 and in part by bent spring washers 237 which urge the tapered head 217 on the mandrel chuck into tight and rotation-resisting contact with the conical seat formation 216 of the non-rotating jackscrew sleeve assembly 208. Accordingly, with the mandrel spindle 167 stationary, motor pinion gear 137 rotates planetary gears 163 about their axes 165 to impart right-hand rotation to the internal gear 173 which, by virtue of its frictional engagement with clutch housing 156 imparts right-hand rotation thereto and it, in turn, through its sleeve pinion 183 and planetary gears 184 that react against ring gear 34 drives the jackscrew 186 in the same right-hand direction, thereby, through balls 206 and sleeve 209, feeding jackscrew sleeve assembly 208 (consisting of elements 209 and 211) forwardly, that is, in a reverse manner in which the pull-up stroke was effected.

The jackscrew sleeve assembly 208 and the mandrel chuck 218 move forwardly, that is, to the left as viewed in the figures, the transverse pin 245 traverses the slot 246 until it contacts the forward end thereof at which point the axial force of the jackscrew sleeve assembly 208 is transmitted to the mandrel 87 thereby tending to separate the rivet head from anvil 213. Frequently the stroke adjustment will be sufficient that the axial pull-up travel, as well the return travel, will be substantially less than the travel space or length of slot 246 in the mandrel enlargement 242', in which case the transverse pin 245 would not contact the forward or left end of slot 246 until after the jackscrew sleeve assembly 208 and the mandrel chuck 218 have completed the return stroke and during the unthreading or release of the mandrel threads from the upset rivet.

At the completion of the return stroke the rear thrust bearing race 236 abuts the face of the forward thrust bearing plate 235. The continuing reverse rotation of the clutch housing 156 and of the jackscrew 186 continues to drive the jackscrew sleeve assembly 208 forwardly and to the left against the bent spring washers 237 until the small clearance is developed between the tapered head 217 of the mandrel chuck 218 and the conical seat formation 216 of the jackscrew sleeve assembly, Fig. 3a. The rotative momentum of the clutch housing 156 is sufficient to effect this clearance.

The forward thrust plate 235 and the flattening of the springs limits the return stroke. This plate abuts the shoulder 236' of the jackscrew housing 36 and/or the end of the mandrel housing 228. This is the position for the maximum pull-up stroke. For less amounts of pull-up stroke the mandrel housing 228 is threaded further into the end of the jackscrew sleeve housing 36 so that its end then constitutes the stroke limiting abutment.

To insure the proper sequence of the return stroke of the jackscrew sleeve assembly 208 and mandrel unthreading, it is essential that the spring washers 237 exert sufficient force to prevent slippage of the tapered head 217 of the mandrel drive chuck 218 on the conical seat formation 216 of the jackscrew sleeve assembly 208, and, to assure this, the frictional torque developed at these surfaces by said spring washers is substantially twice that exerted by the drag spring ring 192 on the clutch housing 156. The rotative momentum of the clutch housing 156 must be sufficient to drive the jackscrew sleeve forwardly and to the left to compress the spring washers 237 in order to provide the adequate clearance of the tapered chuck head 217 and the conical seat formation 216. The frictional effect of the drag spring ring 192 is reduced to a minimum during the return stroke. This is effected by mounting the drag spring ring in the manner as shown in Fig. 14 so that right-hand rotation of the clutch housing tends to pull the drag ring into closer contact with the clutch surface and develop the desired frictional force whereas rotation of the clutch housing 156 in the reverse direction, as shown in Fig. 14, will tend to release the grip of the drag ring from the clutch housing.

After the jackscrew sleeve assembly 208 compresses the spring washers 237, and the clearance provided between the tapered chuck head 217 and the conical jackscrew sleeve formation 216 develops the threading out of the mandrel 87 from the rivet 88, and thereby the final backing off of the tool, is effected. The jackscrew 186 and the clutch housing 156 are prevented from further rotation because of the termination of the travel of the jackscrew sleeve assembly 208 resulting from flattening of springs 237. With rotation of housing 156 terminated continued rotation of pinion gear 137 rotates pinions 163 upon their axes 165, and since internal gear 173 is held stationary by its frictional engagement with now-stationary housing 156 spindle 167 and mandrel drive chuck 218 are driven in the left hand direction. This rotation of the chuck 218 is transmitted by slot 246 and tranverse pin 245 to the mandrel 87 so that the mandrel will be released from the upset rivet.

It should now be apparent that there has been provided a power-driven tool for upsetting tubular rivets or clinch nuts wherein upon the initial pull of a press button that directs air to the air motor, the tool mandrel will be engaged with the internal threads of the rivet, the anvil brought into tight contact with the flange of the rivet, the rivet, upon the frictional contact of the flanged head of the rivet and the anvil being sufficient, being automatically upset with the said initial and part way pull of the press button. A further pull of the press button to move the valve element will automatically effect the return stroke of the jackscrew sleeve assembly, unthread the mandrel from the upset rivet, and back off the tool from the rivet. Thus with two distinct pulls, the second pull being a continuation of the first pull, upon the press button, the tool engages with the rivet and upsets it and then disengages from the rivet.

While various changes may be made in the detail construction of this tool it shall be understood that such changes shall be within the spirit and scope of this invention as defined by the appended claims.

What is claimed is:

1. A power-driven tool for upsetting tubular rivets or clinch nuts comprising a housing body, a reversible motor in the housing body, means for controlling the operation of said motor, a mandrel spindle extending through the housing body, planetary elements connected to the mandrel spindle and to the reversible motor to be driven by the same, a first ring gear means rotatable upon said mandrel spindle and engaging the planetary elements, means normally resisting the rotation of said gear means in one direction but permitting free rotation in the opposite direction, a jackscrew rotatable about said mandrel spindle and having planetary elements journalled thereon, a second ring gear means fixedly mounted on the housing body and cooperating with the jackscrew planetary elements to effect planetary action thereof, a jackscrew sleeve assembly cooperating with said jackscrew and axially movable within the housing body by the jackscrew, a mandrel chuck slidably and rotatably connected to the mandrel spindle, said jackscrew sleeve assembly being engageable with the chuck when the jackscrew is operated to axially move the chuck, a threaded mandrel having a lost motion connection with said mandrel chuck, and anvil means adapted to cooperate with the head of the rivet against which anvil means the rivet may be held when the pulling action of the jackscrew is effected, said rotation-resisting means permitting rotation of said first ring gear means in said opposite direction upon the rivet being brought into tight frictional contact with the anvil, whereby the pull-up stroke of the jackscrew sleeve is automatically effected after the threading action of the mandrel upon the rivet.

2. A power-driven tool for upsetting tubular rivets or clinch nuts as defined in claim 1, and said first ring gear means comprising a clutch member, a ring gear element engaging the planetary elements and frictionally engaging the clutch member, and biasing means carried by the clutch member and normally holding said ring gear in frictional engagement with said clutch member.

3. A power-driven tool for upsetting tubular rivets or clinch nuts as defined in claim 1, and said first ring gear means comprising a clutch member having an internally-tapered clutch face, a ring gear element having a cooperating clutch face engaging with said clutch face, said clutch member being internally-threaded, an annular plate engaging one end of the ring gear element, a wavy spring engaging said annular plate, and a nut adjustable on the threads of the clutch member and pressing said wavy spring and said annular plate into pressure engagement with the ring gear element.

4. A power-driven tool for upsetting tubular rivets or clinch nuts as defined in claim 1, and said first ring gear means having an outer peripheral surface and said means for releasably resisting the rotation of said first ring gear means comprising a split drag spring ring engaging with said outer peripheral surface and having one end loosely anchored to said housing body to retain the same against rotation relative thereto.

5. A power-driven tool for upsetting tubular rivets or clinch nuts as defined in claim 1, and a ball bearing assembly for supporting the jackscrew in the housing body lying adjacent to the planetary elements thereof and having an outer race secured to the housing body and an inner race secured to the jackscrew.

6. A power-driven tool for upsetting tubular rivets or clinch nuts as defined in claim 1, and said jackscrew having a helical groove and said jackscrew sleeve having an opposing helical groove and ball elements operable in the helical path provided by these cooperating grooves, and abutments in the respective opposite ends of the groove of the jackscrew for retaining the ball elements against axial displacement from the ends of the groove.

7. A power-driven tool for upsetting tubular rivets or clinch nuts as defined in claim 1, said jackscrew sleeve comprising an inner member and an outer member threadedly adjustable relative to each other, said outer member having splines and said housing body having splines cooperating with the splines of the jackscrew sleeve outer member thereby to hold said jackscrew sleeve against rotation relative to said housing body.

8. A power-driven tool for upsetting tubular rivets or clinch nuts as defined in claim 1, and thrust bearing means connected to said mandrel drive chuck, abutment means on said housing engageable by said thrust bearing means to limit the forward movement of the drive chuck to which the thrust bearing means is connected, biasing spring washers surrounding the mandrel drive chuck and disposed between the thrust bearing and the forward end of the jackscrew sleeve to absorb rotative momentum of the driving parts of the jackscrew sleeve.

9. A power-driven tool for upsetting tubular rivets or clinch nuts as defined in claim 8, and said abutment means on the housing body comprising a mandrel housing threadedly adjustable within the housing body to locate the abutment means for the thrust bearing plates at different positions and to thereby alter the length of stroke of the jackscrew sleeve and the extent of pull in upsetting the rivet.

10. A power-driven tool for upsetting tubular rivets or clinch nuts as defined in claim 1, said anvil means being axially adjustable in the housing body so that the tool may be adapted for different length rivets.

11. A power-driven tool for upsetting tubular rivets or clinch nuts as defined in claim 8, and said abutment means of the housing body comprising a mandrel housing threadedly adjustable within the housing body to locate the abutment means for the thrust bearing plates at different positions and to thereby alter the length of stroke of the jackscrew sleeve and the extent of pull in upsetting the rivet, and said anvil means being axially adjustable in said mandrel housing whereby the tool can be adapted for different length of rivets.

12. A power-driven tool for upsetting tubular rivets or clinch nuts as defined in claim 8, and said abutment means of the housing body comprising a mandrel housing threadedly adjustable within the housing body to locate the abutment means for the thrust bearing plates at different positions and to thereby alter the length of stroke of the jackscrew sleeve and the extent of pull in upsetting the rivet, and said anvil means being axially adjustable in said mandrel housing whereby the tool can be adapted for different length of rivets, and lock nuts disposed respectively on the mandrel housing and on the anvil means to fix the mandrel housing and the anvil in their adjusted positions.

13. A power-driven tool for upsetting tubular rivets or clinch nuts as defined in claim 1, and biasing means acting between the housing body and the mandrel to retain the mandrel in its retracted position within the mandrel drive chuck and against forward displacement therefrom whereby to normally urge the rivet, when once placed on the mandrel, toward and against the anvil.

14. A power-driven tool for upsetting tubular rivets or clinch nuts as defined in claim 1, and said housing body comprising a handle casting having a depending hand grip portion, a jackscrew housing, and said second ring gear being interposed and retained between joined ends of said handle casting and the jackscrew housing.

15. A power-driven tool for upsetting tubular rivets or clinch nuts as defined in claim 1, and said housing body including a handle casting having a hollow body portion with small and large diameter openings therein, said motor being disposed in the small diameter opening and having a drive pinion extending into the large diameter opening, a shoulder lying between the two openings of the hollow cylinder portion of the handle casting, a clamping plate means secured to said shoulder and retaining said motor within said small opening and against forward axial displacement relative thereto, said first ring gear means including a clutch housing lying within the large diameter opening and a ring gear releasably retained against the clutch housing and engaging the planetary elements of the mandrel spindle, and said means normally resisting the rotation of said first ring gear means comprising a drag spring ring engaging the outer periphery of the clutch housing and loosely anchored to the handle casting.

16. A power-driven tool for upsetting tubular rivets or clinch nuts as defined in claim 1, and said housing body including a handle casting having a hollow cylinder portion and a depending hand grip portion, and a jackscrew housing detachably connected to the hollow cylinder portion of the handle casting, said reversible motor lying in the hollow cylinder portion of the handle casting and being of the compressed air type, and said control means therefor comprising a press button forward and reverse valve assembly having a bushing with openings therein and a valve element slidable within the bushing between forward and reverse portions therein, a push button member slidable in the valve element, said handle casting having an opening for receiving said valve assembly and passageway means extending between the opening and the air motor in the hollow cylinder portion of the handle casting, a throttle lever pivoted in the handle casting and operable by said press button member slidable in the valve element, valve means adapted to be depressed by the throttle lever and disposed within said hand grip portion, air chamber means for directing air from said throttle valve means to said opening and ports of the forward and reverse valve assembly.

17. A power-driven tool for upsetting tubular rivets or clinch nuts as defined in claim 1, and said housing body comprising a handle casting having a hollow cylinder portion and a depending hand grip portion, said reversible motor being of the rotary compressed air type and mounted in said hollow cylinder portion of the handle casting, said hand grip portion having an opening and passages communicating between the openings and the air motor in the hollow cylinder portion, a forward and reverse valve assembly mounted in said opening and having a press button for the actuation thereof, air chamber means for supplying air under pressure to the valve assembly and throttle means operable by the press button of the air assembly to control the flow of air to the air chamber, and lubricating means in the hand grip portion including a wick for extending into the air chamber in the hand grip means to mix the oil with the air, and said air motor comprising end plates containing bearing assemblies and a rotor journalled in the bearing assemblies, said motor having an exhaust air space and said end plates having passages communicating with said exhaust air space of the motor whereby the oil bearing air can be delivered to the bearing assemblies of the end plates.

18. A power-driven tool for upsetting tubular rivets or clinch nuts as defined in claim 17, and said first ring gear means including a clutch housing lying within the hollow cylinder portion of the handle casting and a ring gear element frictionally engaging said clutch housing, said ring gear element meshing with the planetary elements, the pinion of the motor engaging the planetary elements, said air lubricating the bearing assemblies of the motor being dischargeable into the space of the hollow cylinder portion of the handle casting to lubricate the pinion, planetary and ring gear elements, said clutch housing having openings therein to discharge the oil-bearing air to the jackscrew housing to lubricate the second ring gear means, the planetary elements associated therewith, the jackscrew and jackscrew sleeve.

19. A power-driven tool for upsetting tubular rivets or clinch nuts as defined in claim 1, said first ring gear means comprising a clutch housing, a releasable ring gear element lying within the clutch housing and biasing means carried by the clutch housing and urging the engagement of the ring gear element with the clutch housing, said means for restraining the rotation of the first ring gear means comprising a spring drag ring surrounding the clutch housing and anchored to the rear casting, said means connecting the first ring gear means with the planetary elements of the jackscrew comprising a sleeve journalled on the mandrel spindle and secured to the clutch housing to be rotated thereby, the sleeve having pinion gear formation thereon engaging with the jackscrew planetary elements, and said second ring gear means being fixed between the rear casting and the jackscrew housing, said jackscrew being journalled on the clutch housing sleeve, a small bearing assembly having an outer race and an inner race, thrust plates disposed against the second ring gear means and the jackscrew housing for retaining the ball bearing assembly against axial displacement, said inner race being fixed to said jackscrew and serving to support the jackscrew, the clutch housing sleeve and the mandrel spindle being axially aligned with the motor pinion.

20. A power-driven tool for upsetting tubular rivets or clinch nuts as defined in claim 19, said housing body further including a mandrel housing adjustable in the jackscrew housing and providing an abutment therewithin, said mandrel chuck having splines and said mandrel spindle having splines cooperating with the mandrel chuck splines, a thrust plate assembly carried by the mandrel chuck and engageable with the mandrel housing to limit the movement of the mandrel chuck, conical spring washers surrounding the mandrel chuck and engaging the thrust plate means and adapted to engage the forward end of the jackscrew sleeve, said anvil means being adjustable in the mandrel housing to adapt the tool for different length rivets, spring biasing means acting between the mandrel housing and the mandrel to normally urge the mandrel toward the mandrel chuck and a rivet on the mandrel toward and into engagement with the anvil and lock nuts on the mandrel housing and anvil to lock the same in their adjusted positions.

No references cited.